April 2, 1929.  B. F. HALE  1,707,551
FLOWERPOT
Filed March 7, 1927
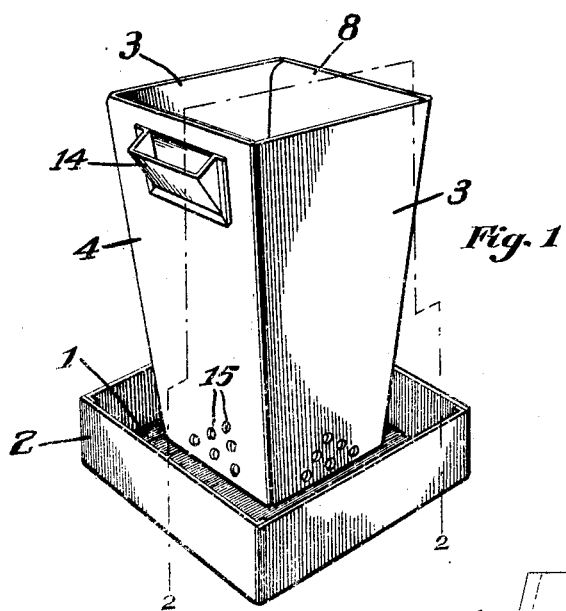
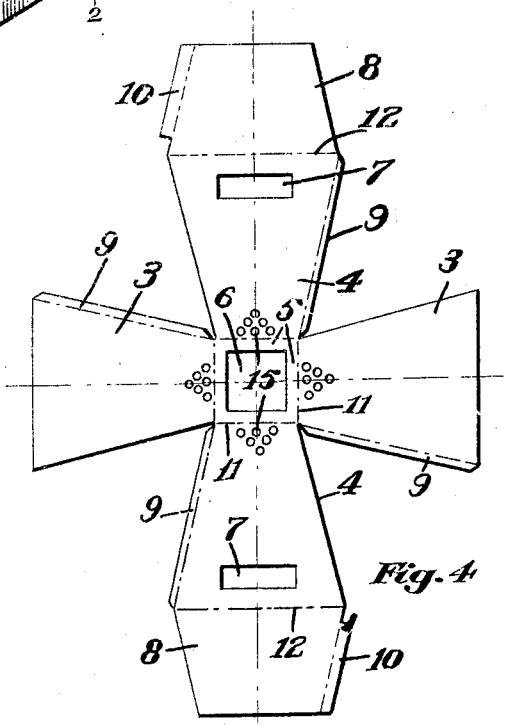
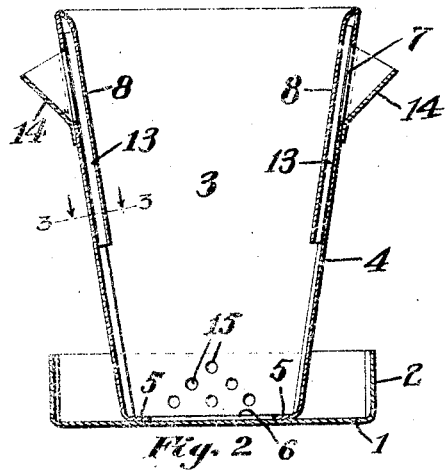
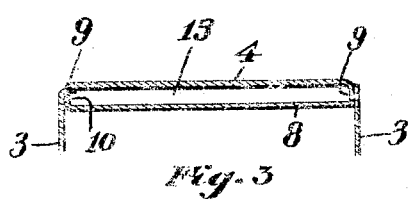
Inventor:
Benjamin F. Hale
BY
Attorney.

Patented Apr. 2, 1929.

1,707,551

UNITED STATES PATENT OFFICE.

BENJAMIN F. HALE, OF CAPE ELIZABETH, MAINE.

FLOWERPOT.

Application filed March 7, 1927. Serial No. 173,262.

The ordinary flower pot is made of clay or the like and does not permit the supply of either air or water directly to the roots or lower parts of the plant.

I accomplish this result while at the same time effecting certain economies in manufacturing costs as well as obtaining a pot which is capable of certain decorative effects as to both outline and surface ornamentation by the use of sheet material shaped and bent in such manner as to provide a suitable walled enclosure for the plant and also to deliver air and moisture directly to the plant roots.

In carrying out my invention, I form from sheet metal or other suitable material, an open top walled container, and slot one or more of the pot walls between its upper and lower edges. The slotted walls at their upper edges have end extensions which are adapted to be folded inwardly in spaced relation thereto so as to define with said walls combination air and water passages closed at their upper edges by the fold of the material and open at their lower edges and communicating with the exterior of the pot through said slots.

Preferably the pot is formed from a single blank of sheet material which is so shaped and slotted as to provide when bent to form a pot embodying the foregoing characteristics. With such a pot I use the usual dish or saucer as a base, but I not only utilize the dish as a bottom closure for the pot but I rigidly secure it to the pot so that the two members can be moved as a unit.

My construction not only results in a decided economy in manufacturing and assembly costs but the use of sheet material offers certain possibilities in the way of artistic decorative effects in that the pot may be assembled in a variety of shapes and may be painted in a variety of colors and designs.

The construction and method of assembling my flower pot is described and illustrated in the accompanying specification and drawings, and the characteristic features of novelty are particularly pointed out in the appended claims. In the drawings:

Fig. 1 is a perspective view of a flower pot in accordance with my invention.

Fig. 2 is a vertical section on the line 2—2 of Fig. 1.

Fig. 3 is a transverse section on the line 3—3 of Fig. 2, and

Fig. 4 is a development of the flower pot blank.

I have indicated at 1 a shallow base or dish presenting a flat solid bottom and an upturned enclosing rim 2. The flower pot proper consists of a generally upwardly flaring walled container or enclosure which is open at its top and at its bottom is closed by the solid bottom wall of the base 1 with which it is rigidly connected in any suitable manner, as by soldering.

Preferably, the flower pot proper is formed from a single blank of sheet material, as sheet metal.

Referring to Fig. 4, which shows a development of the blank, it will be seen that I provide a plurality of symmetrically disposed wings 3 and 4 extending radially from a central portion 5 which is cut away as indicated at 6. The wings flare outwardly from the central portion 5 and certain of them, here shown as an oppositely disposed pair 4 are slotted between their ends as indicated at 7, and are provided with reversely flared end extensions or flaps 8. Each wing is provided at one lateral edge with a longitudinally extending flange 9 and each wing extension is similarly provided with a similarly extending flange 10. The flanges 9 are formed on the edge of the wing farthest removed from the next adacent wing and the flanges 10 are formed on the edge of the wing extension farthest away from the flange 9 on the wing 4 which carries the extension.

In assembling, the wings 3 and 4 are bent upwardly at right angles to the central portion 5 along the indicated lines of fold 11 (Fig. 4) to the position shown in Figs. 1 and 2, and the wing extensions 8 are bent inwardly over upon their wings 4 along the indicated lines of fold 12 (Fig. 4) so as to lie inside the enclosure 3 opposite the slots 7 and in spaced relation to the wings 4 so as to define with said wings 4 intake openings or passages 13 (Figs. 2 and 3) for the admission of air and water interiorly of the pot. These passages are open at their bottoms and closed at their tops by the fold of the material at 12. At their ends they are closed by the flanges 9 and 10 of the wings and wing extensions, respectively, which are folded to interlock with each other as shown in Fig. 3. This interlock also assists in holding the wings in the relation illustrated.

The material 5 of the blank between the cut out 6 and the wings 3 and 4 constitutes an annular attaching frame by means of which the blank may be rigidly fastened to the bottom wall of the pan or dish 1, as shown in Fig. 2.

For convenience of pouring water into the passages 13, I solder or otherwise attach to the wings 4 exteriorly thereof a pair of outwardly projecting spout-forming members 14, which also serve as convenient handles by means of which the pot and with it the attached base may be moved from place to place. If desired, the wings 3 and 4 may also be perforated near their lower edges, as indicated at 15.

Various modifications in the construction of my device may obviously be resorted to without departing from the spirit of my invention if within the limits of the appended claims.

What I therefore claim and desire to secure by Letters Patent is:

1. A flower pot, comprising a plurality of walls defining an open-topped container, one of said walls between its top and bottom edges having an intake opening therein and above said intake having an extension adapted to be folded inwardly relative to said wall and in spaced relation thereto to define therewith an open bottom passage communicating with the exterior of the pot through said intake opening.

2. A flower pot, comprising a plurality of walls defining an open-topped container, one of said walls between its top and bottom edges having a slot therein and above said slot having an extension adapted to be folded inwardly relative to said wall and in spaced relation thereto to define therewith an open bottom passage communicating with the exterior of the pot through said slot, said slotted wall and an adjacent wall and said wall extension each having a longitudinal flange on one edge thereof which flanges when the wall extension is folded inwardly are adapted to close the ends of said passage.

3. A flower pot comprising a blank of sheet material shaped to provide when bent upon itself along angularly intersecting lines of fold a plurality of overlapping upwardly extending side walls, one of said walls having between its top and bottom edges an intake opening therein and beyond said intake having an extended portion adapted to be folded inwardly relative to said wall in spaced relation thereto to define therewith an open bottomed passage communicating with the exterior of the pot through said intake.

4. A flower pot comprising a blank of sheet material shaped to present a central portion and a plurality of radially extending outwardly flaring wings providing when bent along angularly intersecting lines of fold a plurality of overlapping upwardly extending side walls, an opposite pair of said wings each having between its top and bottom edges a slot therein and beyond said slot having an extended portion flared in reverse direction to the flare of the wing and adapted to be folded inwardly relative to said wall in spaced relation thereto to define therewith an open bottomed passage communicating with the exterior of the pot through said slot.

5. A flower pot comprising a blank of sheet material shaped to present a central portion and a plurality of radially extending outwardly flaring wings providing when bent along angularly intersecting lines of fold a plurality of overlapping upwardly extending side walls, an opposite pair of said wings each having between its top and bottom edges a slot therein and beyond said slot having an extended portion flared in reverse direction to the flare of the wing and adapted to be folded inwardly relative to said wall in spaced relation thereto to define therewith an open bottomed passage communicating with the exterior of the pot through said slot, the wings and wing extensions each having a longitudinal flange on one edge thereof which when the wing extensions are folded inwardly are adapted to close the ends of said passages.

6. A flower pot presenting a walled enclosure, having an intake opening therein between its top and bottom edges, and a member disposed within the pot and connected along an edge thereof with the pot wall but spaced from said wall to define therewith an open-bottomed passage communicating with the exterior of the pot through said opening in the pot wall.

7. A flower pot, comprising a blank of sheet material shaped to provide, when bent upon itself, a plurality of adjacent side walls, one of said walls having between its top and bottom edges an intake opening therein, and a member disposed within the pot and connected along an edge thereof with the pot wall but spaced from said wall to define therewith an open-bottomed passage communicating with the exterior of the pot through said intake in the pot wall.

8. A flower pot, comprising a blank of sheet material shaped to provide, when bent upon itself, a plurality of upwardly flaring adjacent walls, one of said walls having between its top and bottom edges an intake opening therein, and a member flared in reverse direction to the flare of the pot walls and disposed within the pot and connected along an edge thereof with the pot wall but spaced from said wall to define therewith an open-bottomed passage communicating with the exterior of the pot through said intake in the pot wall.

In testimony whereof I affix my signature.

BENJAMIN F. HALE.